United States Patent [19]

Thorington et al.

[11] 3,892,997
[45] July 1, 1975

[54] ARC DISCHARGE LAMP FOR PRODUCING CONTROLLED ENERGY SPECTRUM

[75] Inventors: Luke Thorington, Berkeley Heights; Louis J. Parascandola, North Bergen, both of N.J.

[73] Assignee: Duro-Test Corporation, Fair Lawn, N.J.

[22] Filed: Mar. 27, 1972

[21] Appl. No.: 238,325

Related U.S. Application Data

[60] Division of Ser. No. 37,433, May 14, 1970, Pat. No. 3,670,193, which is a continuation of Ser. No. 654,148, July 18, 1967, abandoned.

[52] U.S. Cl. ............................... 313/487; 313/112
[51] Int. Cl. ............................................. H01j 61/44
[58] Field of Search ............. 313/109, 25, 184, 112, 313/487, 480

[56] References Cited
UNITED STATES PATENTS
2,748,303  5/1956  Thorington ..................... 313/109 X
3,148,300  9/1964  Graff ............................ 313/112 X

*Primary Examiner*—Palmer C. Demeo
*Attorney, Agent, or Firm*—Darby & Darby

[57] ABSTRACT

A vapor discharge lamp which produces visible light energy and energy in the middle and near ranges of the ultraviolet region of a quantity from between about 6 to 50 and 150 to 700 microwatts respectively per lumen of visible light produced.

10 Claims, 1 Drawing Figure

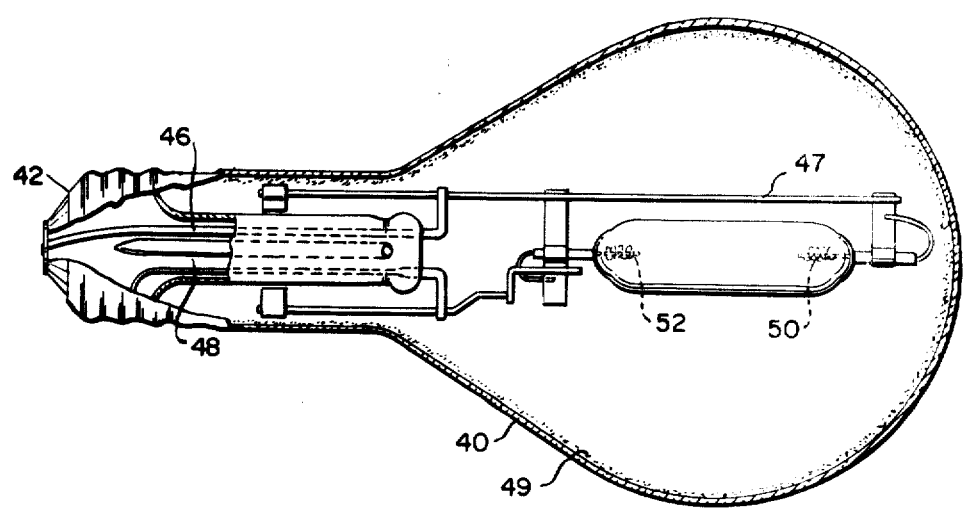

ARC DISCHARGE LAMP FOR PRODUCING CONTROLLED ENERGY SPECTRUM

This application is a division of our prior copending application Ser. No. 37,433, filed on May 14, 1970, now U.S. Pat. No. 3,670,193, issued June 13, 1972, which in turn is a continuation of application Ser. No. 654,148, filed on July 18, 1967 (now abandoned) both of which are assigned to the same assignee and the specifications of which are incorporated herein by reference.

In the said prior applications there are disclosed electric lamps having spectral radiation characteristics approximating natural daylight. These lamps produce a controlled amount of energy in the near and middle ultraviolet ranges and also produce light of a sufficient intensity and proper color to make them usable as general illuminants.

As is known, existing illuminants for general use have very distorted spectra in the visible as well as the ultraviolet wavelength ranges when compared to natural daylight. This is shown in Table I below which lists values of color, color rendering index (CRI), color temperature, and ultraviolet output per lumen for typical sources heretofore available.

of Measuring and Specifying Color Rendering of Light Sources," Illuminating Engineering, Vol. LVII, No. 7, p. 471 (July 1962)

Color Temperature — The temperature at which light from a complete radiator (black body) matches in chromaticity the light from a given source Middle UV — the ultraviolet portion of the spectrum of natural daylight in the range of 290–320 nm. (nanometers)

Near UV — the ultraviolet portion of the spectrum of natural daylight in the range of 320–380 nm.

UV microwatts/lumen — the amount of ultraviolet energy present per lumen of light output of the source. The values on the Table in parenthesis ( ) are estimated and are extrapolations from the standard, black body, temperature curve locus.

The values listed in Table I are for typical lamps which are commercially available. While there may be some variance in the values given, due to manufacturing and material differences, the listed values are believed to be typically representative of the various types of sources.

As seen from Table I, none of the general types of prior art illuminants listed match natural light in all of

TABLE 1

| Light Source | Color x | Color y | CRI | Color Temp. °K | UV microwatts/lumen Middle-UV | Near-UV |
|---|---|---|---|---|---|---|
| Outdoor Light | .332 | .348 | 100 | 5500 | 10.7 | 254 |
| Outdoor Light | .313 | .329 | 100 | 6500 | 18.5 | 390 |
| Outdoor Light | .299 | .315 | 100 | 7500 | 27.9 | 535 |
| Fluorescent "Cool White" Type Lamp | .370 | .377 | 66 | 4300 | 26 | 30 |
| Fluorescent "Warm White" Type Lamp | .430 | .406 | 54 | 3100 | 19 | 38 |
| Fluorescent White Lamp | .406 | .395 | 59 | 3550 | 25 | 51 |
| Fluorescent "Daylight" Type Lamp | .310 | .333 | 75 | 6700 | 15 | 37 |
| Fluorescent Deluxe "Cool White" Type Lamp | .369 | .369 | 86 | 4200 | 19 | 40 |
| Fluorescent Deluxe "Warm White" Type Lamp | .434 | .400 | 77 | 3000 | 14 | 30 |
| 400 w. Mercury Vapor Clear Lamp | .331 | .379 | (22) | (5690) | 75 | 956 |
| 400 w. Mercury Vapor Color Improved Lamp | .412 | .450 | (45) | (3800) | 7 | 361 |
| 1000 w. Mercury Vapor Clear Lamp | .330 | .380 | (20) | (5700) | 205 | 1141 |
| Metal-Halide Type Lamp | .373 | .385 | 44 | 4250 | 8.1 | 1018 |
| High Pressure Sodium Lamp | .495 | .385 | 18 | 2100 | 0.2 | 94 |
| Incandescent 100 w. Lamp | .445 | .407 | 98 | 2900 | 4.5 | 40 |
| RS Sunlamp | .409 | .495 | — | (4080) | 547 | 471 |

In Table I, the following definitions apply to the column headings:

$x$ and $y$ are the coordinates on the standard chromaticity diagram of the ICI (International Commission on Illumination) also known as the CIE (Commissione International De Clairrage)

CRI is the so-called color rendering index adopted by the CIE which measures the color properties of a source related to the corresponding color temperature of a black body radiator or natural daylight. Generally, the number 100 represents the reference illuminant (black body or daylight), so the closer the CRI to 100, the more accurate a match to the reference illuminant the light source has. This is described in "Interim - Method its characteristics. For example, the so-called "daylight" fluorescent lamp, which is the only source specifically designed by the lighting industry to match natural daylight, matches it only with respect to color temperature, that is, there is a phase of daylight having a color temperature of the daylight lamp: though only rarely the same chromaticity. The color rendering index for the "daylight" fluorescent is only 75 vs. 100 for natural light and the energy it produces in the near-ultraviolet image is only 37 microwatts/lumen or only about 1/10 that present in natural light. The other sources listed are of a low color temperature, have a poor color rendering index, or have excessively low or high ultraviolet energy content, as compared to natural light.

The present invention is directed to electric lamps which have controlled amounts of ultraviolet energy output in the near and middle ultraviolet energy range and which produce an amount of light output at an acceptable color to be useful as a general illuminant. In accordance with the invention, several types of lamps are described in which the amount of ultraviolet energy in the middle and near ultraviolet ranges is controlled to approximate that of natural daylight. These lamps also have spectral radiation characteristics which produce light having a color closely approximating that of daylight and a relatively high color rendering index.

Accordingly, it is an object of this invention to provide a light source having the characteristics required in a good illuminant and at the same time having a controlled output of middle (290–320 nm.) and near (320–380 nm.) ultraviolet radiation.

Another object of this invention is to provide a general illuminant having a color rendering index over 50 in which there is simultaneously present both middle range ultraviolet (290–320 nm.) and near ultraviolet (320–380 nm.) in a radiant power ratio of near-UV/middle-UV of between 8 and 40.

An additional object is to provide a mercury vapor lamp which produces between about 6 to 50 and 150 to 700 microwatts of middle and near ultraviolet range energy per lumen of visible light produced.

Yet another object is to provide a mercury vapor discharge lamp which produces visible light having a CIE color rendering index of at least 50 and also produces energy in the ultraviolet region in the range of from about 6 to 50 and 150 to 700 microwatts of middle and near range ultraviolet energy respectively per lumen of visible light produced and having a radiant power ratio of near to middle range ultraviolet energy in the range between about 8 to 40.

Other objects and advantages of the present invention will become more apparent upon consideration of the following specification and annexed drawing in which:

The sole FIGURE of the drawing is a view, partially broken away, of a lamp made in accordance with the present invention. In our aforesaid copending patent application, several types of fluorescent lamps were disclosed for producing from a single light source both visible light energy and controlled amounts of energy in the middle and near ultraviolet ranges.

The principles of the present invention are not limited to low pressure fluorescent lamp types. Other types of lamps can be produced having a controlled amount of ultraviolet energy and still be useful for general illuminant purposes. For example, by using a subtractive filter to selectively reduce the ultraviolet radiation from a high pressure mercury lamp (e.g., type H33-1CD as specified by the American Standards Institute) the ultraviolet output per lumen may be brought within the ranges found in natural light. This can be achieved in one embodiment of this invention by adjusting the coating thickness of an ultraviolet absorber such as manganese activated magnesium fluorogermanate phosphor so as to transmit only about 15 percent of the middle- and only about 30% of the near-UV radiation. Heretofore this phosphor has been utilized (see U.S. Pat. No. 2,748,303) for color improvement of this lamp type in which case it is important that all ultraviolet be absorbed in order to have the highest conversion of this radiation into red luminescence. This contrasts with the present invention where it is important to allow a controlled amount of the middle- and near-UV to be radiated by the lamp so as to more closely match natural light. By proper adjustment of this coating, it has thus been found possible to achieve ultraviolet emission levels in this type lamp of about 16 microwatts and 28 microwatts per lumen respectively for the middle- and near-UV regions per lumen of visible light emitted. This brings the lamp quite close to the UV ratios found in natural light although the spectral distribution in the visible range is not quite as good as the produced with the fluorescent lamps described in the aforesaid application. The lumen output of such mercury vapor lamps modified as described above is about 50 lumens per watt.

The drawing shows a mercury vapor lamp constructed in accordance with the present invention. Here, the otherwise conventional lamp has an envelope 40 with a screw type base 42 in which is mounted an arc tube 44 on a support 47. Lead wires 46 and 48 connect the electrodes 50 and 52 of the arc tube to the electrical contacts of the base. The arc tube contains a quantity of mercury which is ionized to produce the light. The interior wall of envelope 40 is coated with the UV absorbing phosphor 49 compound previously described. It should be understood that the thickness of the phosphor coating depends upon the phosphor particle size. Thus, finer phosphor particles can be more densely packed and a thinner coating used to produce the desired amount of absorption, than if larger size phosphor particles are utilized.

Lamps such as high pressure sodium and metal-halide-mercury sources also are correctable by means of either UV emitting phosphors on the outer envelopes and/or additions of other vapor species to the arc itself so as to radiate proportions of ultraviolet energy in the ranges required to simulate what is found in natural light. While such lamps with controlled UV/visible ratios of radiated energy are within the scope of the present invention, they do not represent the best illuminants by reason of their inferior color rendering indexes and discontinuous spectra.

An indicated above, the lamps of the subject invention produce ultraviolet energy in the middle and near ultraviolet ranges in quantities per lumen comparable to natural daylight while at the same time producing sufficient light output at an acceptable color to serve as a general purpose illuminant, e.g., as a light source where prior art lamps are utilized such as in factories, schools, homes, offices, etc.

In accordance with the invention, the glass transmittance characteristics, such as types of glass compositions and thickness and/or the phosphor mixes, and other factors, such as the material for producing the arc discharge are selected to produce a lamp: having a CRI of about 50 or greater: an output of middle UV energy in the ranges of 6–50 microwatts per lumen of visible light emitted: an output of near UV energy in the range of 150–700 microwatts per lumen of visible light emitted: and in which the ratio of near UV/middle UV energy emitted is in the range between about 8 to 40.

The ranges of operation of the various output parameters specified above are selected for the following reasons. First, a CRI of at least 50 is preferable, for a lamp used as a general illuminant since CRIs below this value have very poor color rendering and therefore are poor from the standpoint of perception. Outputs of 6–50 microwatts of middle range UV and 150–700 microwatts of near range UV energy per lumen of visible light emitted by the lamp and maintenance of the ratio of near UV/middle UV in the range of from about 8 to 40 is also desired. The reason for this is that this range of energy outputs and ratios approximates the range of the standard color temperature of natural daylight from about 5,000°K to about 8,000°K which is suitable for illumination purposes. Too far a departure from these temperatures would bring a lamp in the range to where its light output would have a color unsuitable for general illumination purposes. As should be apparent the color temperature of natural daylight varies due to various external factors, including the seasons of the year, and therefore it is impossible to fix upon any one color temperature.

It is also desirable to limit the UV energy output to the ranges specified above in order to prevent undue erythema (burning or reddening of the skin) upon exposure to the lamp. It is preferred that a person exposed to the lamp over a given period of time, say an 8 hour day, receive less than one MPE (minimum perceptible erythema), which is the quantity of UV energy needed to produce just noticeable reddening of the average untanned skin of a Caucasian human. Using the 5,500°K, 91 CRI fluorescent lamp described above, a person exposed to a 100 footcandle level from this lamp (the average level found in an office) over an 8 hour day would receive approximately one-third of an MPE.

What we claim is:

1. A high pressure arc discharge lamp for operation from a source of voltage comprising an envelope, a pair of electrodes for connection to said source of voltage and an ionizable material within said envelope, said electrodes and ionizable material producing an arc discharge which emits energy in both the visible light and ultraviolet range, and means interacting with the energy emitted by the arc discharge to modify the energy such that ultraviolet energy is transmitted through the envelope in the middle range and near range respectively of between about 6 to 50 and 150 to 700 microwatts per lumen of the visible light transmitted through the envelope and with a radiant power ratio of near ultraviolet/middle ultraviolet in a range of between about 8 to 40.

2. A lamp as set forth in claim 1 wherein the ionizable material is mercury vapor.

3. A lamp as set forth in claim 1 wherein the visible light transmitted through the envelope has a CIE color rendering index of at least 50.

4. A lamp as in claim 1 further comprising an outer envelope within which said fist-named envelope is located, said means interacting with the energy emitted by said arc discharge located at said outer envelope.

5. A lamp as set forth in claim 4 wherein said means for interacting with the energy produced by the arc discharge comprises a phosphor on a wall of the outer envelope.

6. A lamp as in claim 4 wherein said means interacting with the energy comprises said outer envelope which blocks a predetermined portion of the energy emitted by the arc discharge.

7. A lamp as in claim 6 wherein said means for interacting with the energy emitted by the arc stream discharge also includes a phosphor on a wall of the outer envelope.

8. A lamp as set forth in claim 1 further comprising an outer envelope within which said first-named envelope is located and wherein said means interacting with the energy produced by the arc discharge comprises a phosphor on a wall of the outer envelope.

9. A lamp as set forth in claim 5 wherein said phosphor comprises manganese activated magnesium fluorogermanate.

10. A lamp as set forth in claim 4 wherein the visible light transmitted through said outer envelope has a CIE color rendering index of at least 50.

* * * * *